United States Patent [19]

Mishra et al.

[11] Patent Number: 4,634,756

[45] Date of Patent: Jan. 6, 1987

[54] ELECTRICAL RESISTOR

[75] Inventors: Satchidanand Mishra; Leon A. Teuscher, both of Webster, N.Y.

[73] Assignee: Xerox Corporation, Stamford, Conn.

[21] Appl. No.: 801,451

[22] Filed: Nov. 25, 1985

[51] Int. Cl.$^4$ .............................................. C08G 77/26
[52] U.S. Cl. ....................................... 528/38; 338/35; 29/621; 427/101
[58] Field of Search .............. 338/35; 29/621; 528/38; 427/101

[56] References Cited

U.S. PATENT DOCUMENTS

| | | | |
|---|---|---|---|
| 2,377,426 | 6/1945 | Kersten | 201/76 |
| 2,613,302 | 10/1952 | Gurewitsch | 201/73 |
| 3,299,387 | 1/1967 | Sanford | 338/35 |
| 3,703,696 | 11/1972 | Browall et al. | 338/35 |
| 3,864,659 | 2/1975 | Furuuchi et al. | 338/35 |
| 4,270,085 | 5/1981 | Terada et al. | 324/65 |
| 4,386,336 | 5/1983 | Kinomoto et al. | 338/35 |
| 4,442,422 | 4/1984 | Murata et al. | 338/35 |
| 4,464,450 | 8/1984 | Teuscher | 430/59 |
| 4,473,813 | 9/1984 | Kinjo et al. | 338/35 |

Primary Examiner—Melvyn I. Marquis
Attorney, Agent, or Firm—Peter H. Kundo

[57] ABSTRACT

An electrical resistor comprising an insulating substrate, a thin continuous siloxane film of a reaction product of a hydrolyzed silane coated on the insulating substrate, the hydrolyzed silane may have the general formula:

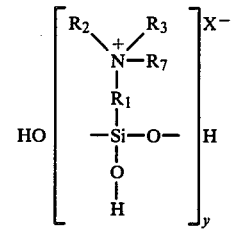

wherein $R_1$ is an alkylidene group containing 1 to 20 carbon atoms, $R_2$, $R_3$ and $R_7$ are independently selected from the group consisting of H, a lower alkyl group containing 1 to 3 carbon atoms and a phenyl group, X is an anion of an acid or acidic salt, and y is 1, 2, 3 or 4, and at least two spaced apart electrodes in electrical contact with the thin continuous siloxane film on the insulating substrate. Processes for preparing and using the resistor are also disclosed.

11 Claims, No Drawings

ELECTRICAL RESISTOR

BACKGROUND OF THE INVENTION

This invention relates in general to resistors and, more specifically, to a novel resistor device and processes for preparing and using the device.

The resistor art is a well developed art with countless variations in compositions, properties and configurations. Although stable properties are normally sought, some resistors are sensitive to changing conditions in the ambient environment brought on by variables such as electromagnetic radiation, temperature, pressure and the like.

One ambient environment characteristic to which resistor sensitivity is normally undesirable, is humidity. Humidity sensitive resistors are useful for numerous devices such as humidity sensors, humidity control devices, or in devices where certain humidity dependent characteristics are to be controlled. Generally, humidity sensitive resistors are to be avoided for highly sophisticated, precision electrical equipment. Although humidity sensitive resistors could be utilized for humidity sensors, many humidity sensitive resistors respond very slowly to changes in humidity. Much of the change in resistivity of some humidity sensors occurs in the high resistivity region and therefore require extremely sensitive and highly sophisticated detection devices. Other humidity sensitive resistors have a limited range of incremental resistivity change with changes in humidity. For example, the humidity sensing membranes of a cured amino group containing organosilicon compound in U.S. Pat. No. 3,864,659 to Furuuchi et al exhibit a limited range of incremental resistivity change and much of the incremental change in resistivity occurs in the difficult to measure high resistivity region. Incremental changes in resistivity in the region greater than about $10^{10}$ ohm-cm are particularly difficult to accurately measure without highly sophisticated scientific research tools.

Some humidity sensitive resistors are unstable over extended periods of use under high or low humidity conditions. Still other humidity sensitive resistors may exhibit complex functional changes in resistivity with changes in humidity. Humidity sensitive resistors which have nonreversible characteristics have only limited utility. Further, other humidity sensitive resistors tend to unduly expand and contract when subjected to different levels of humidity. Such characteristics render most resistors unsuitable or marginally acceptable for use in humidity sensors or similar applications.

Thus, because of the deficiencies of many humidity sensitive resistors, there is a need for an improved humidity sensitive resistor.

SUMMARY OF THE INVENTION

It is an object of the invention to provide an electrical resistor comprising an insulating substrate, a thin continuous siloxane film of a reaction product of a hydrolyzed silane coated on an insulating substrate, the hydrolyzed silane having the general formula:

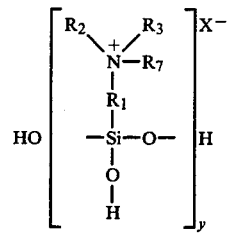

wherein $R_1$ is an alkylidene group containing 1 to 20 carbon atoms, $R_2$, $R_3$ and $R_7$ are independently selected from the group consisting of H, a lower alkyl group containing 1 to 3 carbon atoms and a phenyl group, X is an anion of an acid or acidic salt, and y is 1, 2, 3 or 4 and at least two spaced apart electrodes in electrical contact with the thin continuous siloxane film. The electrical resistor may be prepared by depositing on the insulating substrate a coating comprising an aqueous solution of a hydrolyzed silane at a pH between about 1 and about 7, drying the reaction product layer to form a siloxane film and applying the spaced apart electrodes to the siloxane film. Humidity may be measured with this resistor by applying an electrical bias across the spaced apart electrodes, exposing the siloxane film to ambient humidity and measuring the electrical resistivity of the siloxane film. Surprisingly, the humidity sensitive resistors of this invention are capable of exhibiting a rapid, exponential, reversible, easily measurable change of resistivity of many orders of magnitude. Moreover, the thin continuous siloxane reaction product film undergoes negligible expansion and contraction during use and therefore is highly resistant to cracking.

The hydrolyzed silane may be prepared by hydrolyzing a silane having the following structural formula:

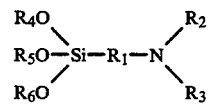

wherein $R_1$ is an alkylidene group containing 1 to 20 carbon atoms, $R_2$ and $R_3$ are independently selected from the group consisting of H, a lower alkyl group containing 1 to 3 carbon atoms, a phenyl group and a poly(ethylene-amino) group, and $R_4$, $R_5$, and $R_6$ are independently selected from a lower alkyl group containing 1 to 4 carbon atoms. Typical hydrolyzable silanes include 3-aminopropyltriethoxysilane, N-aminoethyl-3-aminopropyltrimethoxysilane, N-2-aminoethyl-3-aminopropyltrimethoxysilane, N-2-aminoethyl-3-aminopropyltris(ethylhexoxy)silane, p-aminophenyl trimethoxysilane, 3-aminopropyldiethylmethylsilane, (N,N'-dimethyl3-amino)propyltriethoxysilane, 3-aminopropylmethyldiethoxysilane, 3-aminopropyltrimethoxysilane, N-methylaminopropyltriethoxysilane, methyl[2-(3-trimethoxysilylpropylamino)ethylamino]-3-proprionate, (N,N'-dimethyl3-amino)-propyltriethoxysilane, N,N-dimethylaminophenyltriethoxysilane, trimethoxysilylpropyldiethylenetriamine and mixtures thereof. It has been found that silanes free of amino groups tend to form insulating siloxane reaction product films that are relatively insensitive to changes in humidity.

If $R_1$ is extended into a long chain, the compound becomes less stable. Silanes in which $R_1$ contains about 3 to about 6 carbon atoms are preferred because the molecule is more stable, more flexible and under less strain. Optimum results are achieved when $R_1$ contains 3 carbon atoms. Satisfactory results are achieved when $R_2$ and $R_3$ are alkyl groups. Optimum smooth and uniform films are formed with hydrolyzed silanes in which $R_2$ and $R_3$ are hydrogen. Satisfactory hydrolysis of the silane may be effected when $R_4$, $R_5$ and $R_6$ are alkyl groups containing 1 to 4 carbon atoms. When the alkyl groups exceed 4 carbon atoms, hydrolysis becomes impractically slow. However, hydrolysis of silanes with alkyl groups containing 2 carbon atoms are preferred for best results.

During hydrolysis of the amino silanes described above, the alkoxy groups are replaced with hydroxyl groups. As hydrolysis continues, the hydrolyzed silane takes on the following general structure:

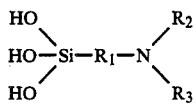

After drying, the siloxane reaction product layer formed from the hydrolyzed silane contains larger molecules in which y is equal to or greater than 6. The reaction product of the hydrolyzed silane may be linear, partially crosslinked, a dimer, a trimer, and the like.

The hydrolyzed silane solution may be prepared by adding sufficient water to hydrolyze the alkoxy groups attached to the silicon atom to form a solution. Insufficient water will normally cause the hydrolyzed silane to form an undesirable gel. Generally, dilute solutions are preferred for achieving thin coatings. Satisfactory reaction product layers may be achieved with solutions containing from about 0.1 percent by weight to about 10 percent by weight of the hydrolyzable silane based on the total weight of solution.

It is critical that the final reaction product of the hydrolyzed silane contain an ion of an acid or acidic salt. Absent any treatment of the hydrolyzed silane with an acid or acidic salt the hydrolyzed silane is inherently basic in water with a pH greater than 7 and does not provide the range of magnitude of change in the measurable range of resistivities of this invention. Thus, unless an acid or acid salt treatment is employed after the hydrolyzed silane is applied to the substrate, the pH of the applied solution of hydrolyzed silane must be carefully controlled by the addition of an acid or acid salt to obtain the superior sensitivity and measurable resistivity range achieved with the materials and processes of this invention. A solution pH of between about 1 and about 7 provides satisfactory sensitivity at relative humidities of between about 20 and about 100.

Control of the pH of the hydrolyzed silane solution to achieve a pH between about 1 and about 7 may be effected with any suitable organic or inorganic acid or acidic salt. Typical organic and inorganic acids and acidic salts include acetic acid, citric acid, formic acid, hydrogen iodide, hydrochloric acid, phosphoric acid, ammonium chloride, hydrofluoriosilicic acid, Bromocresol Green, Bromophenol Blue, p-toluene sulphonic acid and the like. Hydrochloric acid is preferred because it provides a particularly wide range of change in the measurable range of resistivities of this invention and the resulting film electrical properties are especially stable against oxidation.

If desired, the aqueous solution of hydrolyzed silane may also contain additives such as polar solvents other than water to promote improved wetting of the insulating substrate. Improved wetting ensures greater uniformity of the final siloxane layer and more predictable humidity sensitivity characteristics. Any suitable polar solvent other than water may be employed. Typical polar solvents include methanol, ethanol, isopropanol, tetrahydrofuran, methylcellusolve, ethylcellusolve, ethoxyethanol, ethylacetate, ethylformate and mixtures thereof. Optimum wetting is achieved with ethanol as the polar solvent additive. Generally, the amount of polar solvent added to the hydrolyzed silane solution is less than about 95 percent based on the total weight of the solution.

Any suitable technique may be utilized to apply the hydrolyzed silane solution to the insulating substrate. Typical application techniques include spraying, dip coating, roll coating, wire wound rod coating, and the like. Although it is preferred that the aqueous solution of hydrolyzed silane be prepared prior to application to the insulating substrate, one may apply the silane directly to the insulating substrate and hydrolyze the silane in situ by treating the deposited silane coating with water vapor to form a hydrolyzed solution on the surface of the insulating substrate in the pH range described above. The water vapor may be in the form of steam of humid air. Generally, satisfactory results may be achieved when the reaction product of the hydrolyzed silane on the insulating substrate forms a uniform layer having a thickness between about 0.01 micrometer and about 10 micrometers for rapid response. However, thicker films may be used if desired. Very thick reaction product films tend to become brittle and less acceptable for flexible insulating substrates. As the reaction product layer becomes thinner, sensitivity to changes in humidity increases. However, the electrical resistance of the film being inversely proportional to the thickness of the film, the resistance becomes too high for very thin films of less than about 0.01 micrometer at low relative humidity and may become difficult to measure. Since the acid containing films of this invention have a lower overall resistivity, thinner films may be used. Typical bulk resistivities of the hydrolyzed silane films of this invention may change by 4 to 5 orders of magnitude in response to relative humidity changes of from about 5 percent relative humidity to about 95 percent relative humidity at room temperature. At low relative humidities, the bulk resistivity varies from about $10^5$ to about $10^{12}$ ohm-cm for various silanes. Very thick films may increase the resistance beyond readily detectable ranges.

Drying or curing of the hydrolyzed silane upon the insulating layer should be conducted at a temperature greater than about room temperature to provide a reaction product layer having more uniform electrical properties, more complete conversion of the hydrolyzed silane to siloxanes and less unreacted silanol. Generally, a reaction temperature between about 100° C. and about 150° C. is preferred for maximum stabilization of electrochemical properties. Reaction product layers having optimum electrochemical stability are obtained when reactions are conducted at temperatures of about 135° C. The reaction temperature may be maintained by any suitable technique such as ovens, forced air ovens, radiant heat lamps, and the like.

The reaction time depends upon the reaction temperatures used. Thus, less reaction time is required when higher reaction temperatures are employed. Generally, increasing the reaction time increases the degree of cross-linking of the hydrolyzed silane. Satisfactory results have been achieved with reaction times between about 0.5 minute to about 45 minutes at elevated temperatures.

The reaction may be conducted under any suitable pressure including atmospheric pressure or in a vacuum. Less heat energy is required when the reaction is conducted at sub-atmospheric pressures.

One may determine whether sufficient condensation and cross-linking has occurred to form a siloxane reaction product film having stable electrochemical properties in a humidity sensing environment merely by washing the siloxane reaction product film with water, toluene, tetrahydrofuran, methylene chloride or cyclohexanone and examining the washed siloxane reaction product film to compare infrared absorption of Si—O— wavelength bands between about 1,000 to about 1,200 cm$^{-1}$. If the Si—O— wavelength bands are visible, the degree of reaction is sufficient, i.e. sufficient condensation and cross-linking has occurred if peaks in the bands do not diminish from one infrared absorption test to the next. It is believed that the partially polymerized reaction product contains siloxane and silanol moieties in the same molecule. The expression "partially polymerized" is used because total polymerization is normally not achievable even under the most severe drying or curing conditions.

Alternatively, a deposited film of the hydrolyzed silane may subsequently be treated with the vapors of or a solution of a suitable organic or inorganic acid or acidic salt. In this embodiment, it is unnecessary that the deposited film of hydrolyzed silane have a pH of between about 1 and about 7 prior to treatment with the vapors or solution of an organic or inorganic acid or acidic salt. However, the final deposited film of hydrolyzed silane treated with the vapors of or a solution of a suitable organic or inorganic acid or acidic salt will comprise a reaction product of a hydrolyzed silane coated on an insulating substrate, the hydrolyzed silane having the general formula:

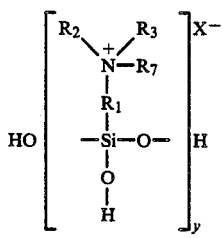

wherein $R_1$ is an alkylidene group containing 1 to 20 carbon atoms, $R_2$, $R_3$ and $R_7$ are independently selected from the group consisting of H, a lower alkyl group containing 1 to 3 carbon atoms and a phenyl group, X is an anion of an acid or acidic salt, and y is 1, 2, 3 or 4. Moreover, the final deposited siloxane reaction product should have a pH of between about 1 and about 7.

Any suitable insulating substrate may be treated with the hydrolyzed silane. The insulating substrate should be wettable by the hydrolyzed silane. Typical insulating substrate include organic materials such as polyesters, polyvinylbutyral, polyvinylpyrolidone, polyurethane, polymethyl methacrylate, polycarbonates, acrylate polymers, cellulose polymers, polyvinylchlorides, polyamides, epoxies, and the like and mixtures thereof and inorganic materials such as glass, quartz, silicon, and the like and mixtures thereof. The organic polymers may be block, random or alternating copolymers. Polymers having polar groups are particularly effective substrates for the siloxane reaction product film of this invention because the adhesion of the silane reaction product is improved substantially. Generally, the bulk resistivity of the insulating substrate should be greater than about $10^{15}$ ohm-cm and greater than the bulk resistivity of the silane reaction product. Where an insulating substrate is poorly wettable with regard to the hydrolyzed silane, one or more intermediate coatings of wettable insulating material may be employed. Such intermediate coating may be any suitable wettable polymer such as the wettable polymers described above. The insulating substrate may be of any suitable configuration such as that of webs, sheets, plates, drums, and the like. The insulating substrate may be supported by any underlying flexible, rigid, uncoated and pre-coated member as desired. The support member underlying the insulating substrate may be of any suitable material including metal, plastics and the like. Generally, where no underlying support member is employed, the insulating substrate should be sufficiently thick to support the thin continuous siloxane reaction product film.

Any suitable combination of at least two spaced apart electrodes in contact with siloxane layer may be used. The electrodes may be of any desirable shape and of any suitable material. Typical electrode materials include metals such as gold, silver, copper, aluminum, resins loaded with conductive particles such as carbon black, graphite or metals, and the like. The electrodes may be attached to the siloxane surface in any suitable manner. If desired, one or more of the electrodes may be fastened to the insulating substrate prior to or subsequent to the formation of the siloxane layer. Typical well known techniques for attaching electrodes to a surface include clamping, conductive adhesives, evaporating, pressure contacting, brushing, spraying, dip coating, roll coating, wire wound rod coating, electroforming, liquid or vapor phase epitaxy, and the like.

Excellent results as a sensor for humidity have been achieved when the thin continuous siloxane reaction product film is employed in resistors comprising an insulating substrate, and at least two spaced apart electrodes in electrical contact with the siloxane film.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

An aqueous solution was prepared containing about 1 percent by weight based on the total weight of the solution, of allyl triethoxy silane which is represented by the formula $H_2C=CHCH_2Si(OC_2H_5)_3$. Sufficient denatured ethanol was added to this aqueous solution so that the final solution contained 90 percent by weight denatured alcohol. The pH of this solution was about 7. This solution was immediately applied with a 0.006 inch Bird applicator onto the surface of a polyester (Mylar, available from E. I. duPont de Nemours & Co.) insulating substrate from which samples were cut, each cut sample having a length of about 5 cm and a width of about 1 cm. The coated substrate was thereafter dried at a temperature of about 135° C. in a forced air oven for about 5 minutes to form a siloxane reaction product layer of the hydrolyzed silane. The dried layer had a thickness of approximately 0.05 micrometer. These coated substrates were evaluated using two different techniques. In the first technique, electrodes were fastened to the resulting coated member by evaporating two spaced apart gold electrodes onto the siloxane reaction product layer. A variable electrical bias was applied across the electrodes and the change in current was measured against the corresponding applied voltage by means of a Keithly current amplifier. In the second technique, a four probe system was used to measure sheet resistivity. The probes or electrodes were chromium plated spring loaded pins. The separation of the four colinear probes was 0.5 cm. The sample dimensions for this measurement technique were 10 cm×20 cm. The change in resistivity was measured as a function of relative humidity. The resistivity at a relative humidity greater than 95 percent was greater than $10^{10}$ ohm-cm. This high resistivity would not be useful for measuring relative humidity because changes in resistivity at high values of resistivity cannot be readily measured with conventional instruments and can only be measured with expensive, complex, highly sophisticated equipment. For example, the cost of a Keithly current amplifier is about two thousand dollars.

EXAMPLE II

The procedures described in Example I were repeated under the same conditions and with same materials except that n-propyltrimethoxy silane having the formula $CH_3CH_2CH_2Si(OCH_3)_3$ was substituted for the allyl triethoxy silane. The pH of the applied hydrolyzed silane was about 7. The resistivities of the samples were found to be greater than $10^{10}$ ohm-cm even at high humidity. Thus, this high resistivities of these samples would not be useful for measuring relative humidity because changes in resistivity at high values of resistivity cannot be readily measured with conventional instruments and can only be measured with expensive, complex, highly sophisticated equipment.

EXAMPLE III

The procedures described in Example I were repeated under the same conditions and with same materials except that 3-chloropropyl trimethoxy silane represented by the formula $ClCH_2CH_2CH_2Si(OCH_3)_3$ was substituted for the allyl triethoxy silane. The pH of the applied hydrolyzed silane was about 7. The resistivities of the samples were found to be greater than $10^{10}$ ohm-cm even at high humidity. Thus, the high resistivities of these samples would not be useful for measuring relative humidity because changes in resistivity at high values of resistivity cannot be readily measured with conventional instruments and can only be measured with expensive, complex, highly sophisticated equipment.

EXAMPLE IV

An aqueous solution was prepared containing about 2.5 percent by weight based on the total weight of the solution, of N,N dimethyl-3-aminopropyltrimethoxysilane. Sufficient denatured ethanol was added to this aqueous solution so that the final solution contained 90 percent by weight denatured alcohol. HCl was added to the solution to bring the pH to about 1. This solution was immediately applied with a 0.006 inch gap Bird applicator onto the surface of a polyester (Mylar, available from E. I. duPont de Nemours & Co.) insulating substrate from which samples were cut, each cut sample having a length of about 20 cm and a width of about 10 cm. The coated substrate was thereafter dried at a temperature of about 135° C. in a forced air oven for about 5 minutes to form a siloxane reaction product layer of the hydrolyzed silane. The dried layer had a thickness of approximately 0.125 micrometer.

EXAMPLE V

The procedures described in Example IV were repeated under the same conditions and with same materials except that no HCl was added. Thus the aqueous solution had a pH greater than 7. The dried layer had a thickness of approximately 0.125 micrometer.

EXAMPLE VI

The samples prepared as described in Examples IV and V were evaluated using a four probe system which measured sheet resistivity. The bulk resistivity ($\rho$) was calculated from these measurements. The probes or electrodes were chromium plated spring loaded pins. The separation of the four colinear probes was 0.5 cm. The change in resistivity was measured as a function of relative humidity. The results of these tests are set forth in Table I below:

TABLE I

| Samples from Example IV (treated with acid) | | Samples from Example V (no treatment with acid) | |
|---|---|---|---|
| RH (%) | $\rho$(ohm-cm) | RH (%) | $\rho$(ohm-cm) |
| 26 | $3.3 \times 10^5$ | | |
| 33 | $4.3 \times 10^4$ | | |
| 40 | $1.4 \times 10^4$ | | |
| | | 44 | $2.7 \times 10^9$ |
| | | 53 | $1.7 \times 10^9$ |
| 64 | $9.3 \times 10^2$ | | |
| 72 | $1.7 \times 10^2$ | | |
| 75 | $4.6 \times 10^1$ | | |
| 80 | $3.4 \times 10^1$ | 80 | $1.2 \times 10^9$ |
| 87 | $2.8 \times 10^1$ | | |
| | | 90 | $2.9 \times 10^8$ |
| $\frac{\rho 40}{\rho 87} =$ | $5.0 \times 10^2$ | $\frac{\rho 44}{\rho 90} \simeq$ | 10 |

No electrical values at relative humidities less than about 44 percent are given for the hydrolyzed silane reaction product that was not treated with an acid because of the great difficulty in measuring resistivities greater than about $10^{10}$ ohm-cm. Thus, in comparing the data in Table I, for a change of relative humidity from about 40 percent to about 90 percent, the change of resistivity for the acid treated hydrolyzed silane reaction product was about 5,000 percent greater than the change of resistivity for the hydrolyzed silane reaction product that was not treated with an acid.

EXAMPLE VII

An aqueous solution was prepared containing about 2.5 percent by weight based on the total weight of the solution, of 3-aminopropyltriethoxysilane. Sufficient denatured ethanol was added to this aqueous solution so that the final solution contained 90 percent by weight denatured alcohol. HCl was added to the solution to bring the pH to about 1. This solution was immediately applied with a 0.006 inch gap Bird applicator onto the surface of a polyester (Mylar, available from E. I. du- Pont de Nemours & Co.) insulating substrate from which samples were cut, each sample having a length of about 20 cm and a width of about 10 cm. The coated substrate was thereafter dried at a temperature of about 135° C. in a forced air oven for about 50 minutes to form a siloxane reaction product layer of the hydrolyzed silane. The dried layer had a thickness of approximately 0.125 micrometer.

EXAMPLE VIII

The procedures described in Example VII were repeated under the same conditions and with same materials except that no HCl was added. Thus the aqueous solution had a pH greater than 7. The dried layer had a thickness of approximately 0.125 micrometer.

EXAMPLE IX

The samples prepared as described in Examples VII and VIII were evaluated using a four probe system which measured sheet resistivity. The probes or electrodes were chromium plated spring loaded pins. The separation of the four colinear probes was 0.5 cm. The sample size was 20 cm × 10 cm. The change in resistivity was measured as a function of relative humidity. The results of these tests are set forth in Table II below:

TABLE II

| Samples from Example VII (treated with acid) | | Samples from Example VIII (no treatment with acid) | |
|---|---|---|---|
| RH (%) | $\rho$(ohm-cm) | RH (%) | $\rho$(ohm-cm) |
| 30 | $2.7 \times 10^5$ | 30 | $4.8 \times 10^4$ |
| 40 | $2.5 \times 10^4$ | 40 | $2.7 \times 10^4$ |
| 55 | $2.5 \times 10^3$ | 55 | $8.1 \times 10^3$ |
| | | 60 | $5.4 \times 10^3$ |
| 65 | $1.1 \times 10^3$ | 65 | $4.2 \times 10^3$ |
| 71 | $4.5 \times 10^2$ | | |
| | | 75 | $2.9 \times 10^3$ |
| 78 | $1 \times 10^2$ | | |
| | | 80 | $1.1 \times 10^3$ |
| 85 | $6.3 \times 10^1$ | 85 | $4.8 \times 10^2$ |
| 90 | $5.1 \times 10^1$ | 90 | $3.9 \times 10^2$ |
| $\frac{\rho 30}{\rho 90} =$ | $5.3 \times 10^3$ | $\frac{\rho 30}{\rho 90} =$ | $1.23 \times 10^2$ |

In comparing the data in Table II, for a change of relative humidity from about 30 percent to about 90 percent, the change of resistivity for the acid treated hydrolyzed silane reaction product was about 4,200 percent greater than the change of resistivity for the hydrolyzed silane reaction product that was not treated with an acid.

EXAMPLE X

An aqueous solution was prepared containing about 2.5 percent by weight based on the total weight of the solution, of 3-aminopropylmethyldiethoxysilane represented by the formula

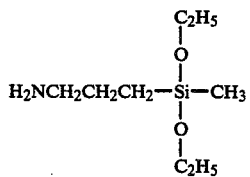

Sufficient denatured ethanol was added to this aqueous solution so that the final solution contained 90 percent by weight denatured alcohol. HCl was added to the solution to bring the pH to about 5. This solution was immediately applied with a 0.006 inch gap Bird applicator onto the surface of a polyester (Mylar, available from E. I. duPont de Nemours & Co.) insulating substrate from which samples were cut, each cut sample having a length of about 20 cm and a width of about 10 cm. The coated substrate was thereafter dried at a temperature of about 135° C. in a forced air oven for about 50 minutes to form a siloxane reaction product layer of the hydrolyzed silane. The dried layer had a thickness of approximately 0.125 micrometer.

EXAMPLE XI

The procedures described in Example X were repeated under the same conditions and with same materials except that no HCl was added. Thus the aqueous solution had a pH greater than 7. The dried layer had a thickness of approximately 0.125 micrometer.

EXAMPLE XII

The samples prepared as described in Examples X and XI were evaluated using a four probe system which measured sheet resistivity. The probes or electrodes were chromium plated spring loaded pins. The separation of the four colinear probes was 0.5 cm. The sample size was 20 cm × 10 cm. The change in resistivity was measured as a function of relative humidity. The results of these tests are set forth in Table III below:

TABLE III

| Samples from Example X (treated with acid) | | Samples from Example XI (no treatment with acid) | |
|---|---|---|---|
| RH (%) | $\rho$(ohm-cm) | RH (%) | $\rho$(ohm-cm) |
| 28 | $5.8 \times 10^5$ | 28 | $1.1 \times 10^8$ |
| 33 | $6.1 \times 10^4$ | | |
| | | 35 | $6.8 \times 10^7$ |
| 42 | $5.4 \times 10^4$ | | |
| | | 50 | $2.8 \times 10^7$ |
| 51 | $1.7 \times 10^3$ | | |
| | | 55 | $9.7 \times 10^6$ |
| 56 | $3 \times 10^3$ | | |
| | | 60 | $6.4 \times 10^6$ |
| | | 66 | $2.0 \times 10^6$ |
| 72 | $1.2 \times 10^2$ | | |
| 78 | $5.4 \times 10^1$ | | |
| | | 80 | $5.4 \times 10^4$ |
| | | 92 | $1.5 \times 10^4$ |
| 93 | $1.7 \times 10^1$ | | |
| $\frac{\rho 28}{\rho 93} =$ | $3.4 \times 10^4$ | $\frac{\rho 30}{\rho 92} =$ | $7.6 \times 10^3$ |

In comparing the data in Table III, for a change of relative humidity from about 30 percent to about 90 percent, the change of resistivity for the acid treated hydrolyzed silane reaction product was about 349 percent greater than the change of resistivity for the hydrolyzed silane reaction product that was not treated with an acid.

EXAMPLE XIII

An aqueous solution was prepared containing about 2.5 percent by weight based on the total weight of the solution, of N-2-aminoethyl-3-aminopropyltrimethoxysilane represented by the formula

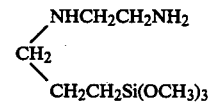

Sufficient denatured ethanol was added to this aqueous solution so that the final solution contained 90 percent by weight denatured alcohol. HCl was added to the solution to bring the pH to about 3. This solution was immediately applied with a 0.006 inch gap Bird applicator onto the surface of a polyester (Mylar, available from E. I. duPont de Nemours & Co.) insulating substrate from which samples were cut, each cut sample having a length of about 20 cm and a width of about 10 cm. The coated substrate was thereafter dried at a temperature of about 135° C. in a forced air oven for about 50 minutes to form a siloxane reaction product layer of the hydrolyzed silane. The dried layer had a thickness of approximately 0.125 micrometer.

EXAMPLE XIV

The procedures described in Example XIII were repeated under the same conditions and with same materials except that no HCl was added. Thus the aqueous solution had a pH greater than 7. The dried layer had a thickness of approximately 0.125 micrometer.

EXAMPLE XV

The samples prepared as described in Examples XIII and XIV were evaluated using a four probe system which measured sheet resistivity. The probes or electrodes were chromium plated spring loaded pins. The separation of the four colinear probes was 0.5 cm. The sample size was 20 cm × 10 cm. The change in resistivity was measured as a function of relative humidity. The results of these tests are set forth in Table IV below:

TABLE IV

| Samples from Example XIII (treated with acid) | | Samples from Example XIV (no treatment with acid) | |
|---|---|---|---|
| RH (%) | $\rho$(ohm-cm) | RH (%) | $\rho$(ohm-cm) |
| 20 | $9.5 \times 10^7$ | 20 | $2.7 \times 10^6$ |
| 25 | $2.2 \times 10^7$ | | |
| | | 29 | $8 \times 10^5$ |
| | | 32 | $5.9 \times 10^5$ |
| 36 | $1.5 \times 10^7$ | | |
| | | 41 | $1.8 \times 10^5$ |
| | | 47 | $1.1 \times 10^5$ |
| 48 | $1.6 \times 10^5$ | | |
| | | 57 | $4.4 \times 10^4$ |
| 63 | $1.5 \times 10^5$ | 63 | $2.4 \times 10^4$ |
| 68 | $2 \times 10^4$ | | |
| 74 | $3 \times 10^3$ | | |
| | | 75 | $1.3 \times 10^4$ |
| 84 | $3.1 \times 10^3$ | | |
| | | 89 | $4.9 \times 10^3$ |
| 90 | $2.5 \times 10^3$ | | |
| $\dfrac{\rho 20}{\rho 90} =$ | $3.8 \times 10^4$ | $\dfrac{\rho 20}{\rho 89} =$ | $5.5 \times 10^2$ |

In comparing the data in Table IV, for a change of relative humidity from about 20 percent to about 90 percent, the change of resistivity for the acid treated hydrolyzed silane reaction product was about 6,796 percent greater than the change of resistivity for the hydrolyzed silane reaction product that was not treated with an acid.

EXAMPLE XVI

An aqueous solution was prepared containing about 2.5 percent by weight based on the total weight of the solution, of 3-aminopropyltriethoxysilane. Sufficient denatured ethanol was added to this aqueous solution so that the final solution contained 90 percent by weight denatured alcohol. Hydrogen iodide was added to the solution to bring the pH to about 1. This solution was immediately applied with a 0.006 inch gap Bird applicator onto the surface of a polyester (Mylar, available from E. I. duPont de Nemours & Co.) insulating substrate from which samples were cut, each cut sample having a length of about 20 cm and a width of about 10 cm. The coated substrate was thereafter dried at a temperature of about 135° C. in a forced air oven for about 5 minutes to form a siloxane reaction product layer of the hydrolyzed silane. The dried layer had a thickness of approximately 0.125 micrometer.

EXAMPLE XVII

The procedures described in Example XVI were repeated under the same conditions and with same materials except that no HCl was added. Thus the aqueous solution had a pH greater than 7. The dried layer had a thickness of approximately 0.125 micrometer.

EXAMPLE XVIII

The samples prepared as described in Examples XVI and XVII were evaluated using a four probe system which measured sheet resistivity. The probes or electrodes were chromium plated spring loaded pins. The separation of the four colinear probes was 0.5 cm. The sample size was 20 cm × 10 cm. The change in resistivity was measured as a function of relative humidity. The results of these tests are set forth in Table II below:

TABLE V

| Samples from Example XVI (treated with acid) | | Samples from Example XVII (no treatment with acid) | |
|---|---|---|---|
| RH (%) | $\rho$(ohm-cm) | RH (%) | $\rho$(ohm-cm) |
| 30 | $1.6 \times 10^5$ | 30 | $2.1 \times 10^5$ |
| 40 | $6 \times 10^4$ | | |
| | | 42 | $8.5 \times 10^4$ |
| 47 | $4 \times 10^4$ | | |
| | | 50 | $3.3 \times 10^4$ |
| 55 | $2.6 \times 10^4$ | | |
| | | 60 | $1.7 \times 10^4$ |
| 65 | $1 \times 10^4$ | 65 | $1.4 \times 10^4$ |
| 70 | $7.8 \times 10^3$ | | |
| 75 | $1.4 \times 10^3$ | 75 | $6.3 \times 10^3$ |
| 90 | $1.1 \times 10^3$ | 90 | $1.7 \times 10^3$ |
| $\dfrac{\rho 30}{\rho 90} =$ | $1.46 \times 10^2$ | $\dfrac{\rho 30}{\rho 90} =$ | $1.24 \times 10^2$ |

In comparing the data in Table V, for a change of relative humidity from about 30 percent to about 90 percent, the change of resistivity for the acid treated hydrolyzed silane reaction product was about 18 percent greater than the change of resistivity for the hydrolyzed silane reaction product that was not treated with an acid. This indicates that although improved results can be achieved with HI compared to the use of no acid, HCl treatment results in much greater improvement.

Although the invention has been described with reference to specific preferred embodiments, it is not intended to be limited thereto, rather those skilled in the art will recognize that variations and modifications may be made therein which are within the spirit of the invention and within the scope of the claims.

We claim:

1. An electrical resistor comprising an insulating substrate, a thin continuous siloxane film of a reaction product of a hydrolyzed silane coated on said insulating substrate, said hydrolyzed silane having the general formula:

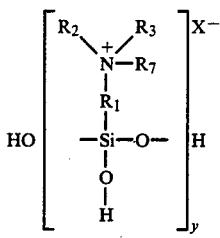

wherein $R_1$ is an alkylidene group containing 1 to 20 carbon atoms, $R_2$, $R_3$ and $R_7$ are independently selected from the group consisting of H, a lower alkyl group containing 1 to 3 carbon atoms and a phenyl group, X is an anion of an acid or acidic salt, and y is 1, 2, 3 or 4, and at least two spaced apart electrodes in electrical contact with said thin continuous siloxane film on said insulating substrate.

2. An electrical resistor comprising an insulating substrate, a thin continuous siloxane film on said insulating substrate, said siloxane film comprising a reaction product of a hydrolyzed silane contacted with an acid or acid salt, said silane having the general formula:

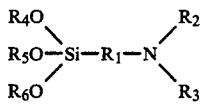

wherein $R_1$ is an alkylidene group containing 1 to 20 carbon atoms, $R_2$ and $R_3$ are independently selected from the group consisting of H, a lower alkyl group containing 1 to 3 carbon atoms, a phenyl group and a poly(ethyleneamino) group, and $R_4$, $R_5$, and $R_6$ are independently selected from a lower alkyl group containing 1 to 4 carbon atoms, and at least two spaced apart electrodes in electrical contact with said thin continuous siloxane film on said insulating substrate.

3. An electrical resistor according to claim 2 wherein said acid is HCl.

4. An electrical resistor according to claim 2 wherein said thin continuous siloxane film has a thickness between about 0.01 micrometer and about 10 micrometers.

5. A process for preparing an electrical resistor comprising providing an insulating substrate, depositing on said insulating substrate a coating comprising an aqueous solution of a hydrolyzed silane having the general formula:

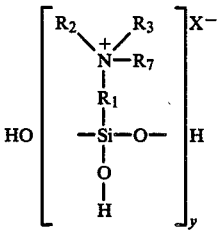

wherein $R_1$ is an alkylidene group containing 1 to 20 carbon atoms, $R_2$, $R_3$ and $R_7$ are independently selected from the group consisting of H, a lower alkyl group containing 1 to 3 carbon atoms and a phenyl group, X is an anion of an acid or acidic salt, and y is 1, 2, 3 or 4, drying said coating to form a siloxane film and applying at least two spaced apart electrodes to said siloxane film.

6. A process for preparing an electrical resistor according to claim 5 including maintaining said aqueous solution at a pH of between about 1 and about 7.

7. A process for preparing an electrical resistor according to claim 5 including maintaining said aqueous solution at a pH of between about 1 and about 7 with an acidic composition selected from the group consisting of organic acids, inorganic acids, organic acid salts, inorganic acid salts and mixtures thereof.

8. A process for preparing an electrical resistor according to claim 5 wherein said aqueous solution comprises from about 0.1 percent by weight to about 10 percent by weight hydrolyzable silane based on the total weight of said aqueous solution prior to hydrolyzing said silane.

9. A process for preparing an electrical resistor according to claim 5 wherein said aqueous solution contains a nonaqueous polar solvent.

10. A process for preparing an electrical resistor comprising preparing a hydrolyzed silane by hydrolyzing a hydrolyzable silane having the general formula:

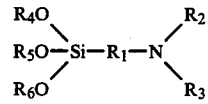

wherein $R_1$ is an alkylidene group containing 1 to 20 carbon atoms, $R_2$ and $R_3$ are independently selected from the group consisting of H, a lower alkyl group containing 1 to 3 carbon atoms, a phenyl group and a poly(ethyleneamino) group, and $R_4$, $R_5$, and $R_6$ are independently selected from a lower alkyl group containing 1 to 4 carbon atoms, providing an insulating substrate, depositing on said insulating substrate a coating of said hydrolyzed silane, drying said coating to form a siloxane film, contacting said siloxane film with vapors or solution of an acid or acid base, and applying at least two spaced apart electrodes to said siloxane film.

11. A process for detecting a change in humidity, comprising providing an electrical resistor comprising an insulating substrate, a thin continuous siloxane film of a reaction product of a hydrolyzed silane coated on said insulating substrate, said hydrolyzed silane having the general formula:

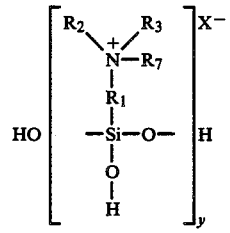

wherein $R_1$ is an alkylidene group containing 1 to 20 carbon atoms, $R_2$, $R_3$ and $R_7$ are independently selected from the group consisting of H, a lower alkyl group containing 1 to 3 carbon atoms and a phenyl group, X is an anion of an acid or acidic salt, and y is 1, 2, 3 or 4, and at least two spaced apart electrodes in electrical contact with said thin continuous siloxane film on said insulating substrate, applying an electrical bias across said spaced apart electrodes, exposing said siloxane film to ambient humidity and measuring the electrical resistivity of said siloxane film.

* * * * *